US012759927B2

(12) United States Patent
Black et al.

(10) Patent No.: US 12,759,927 B2
(45) Date of Patent: Oct. 13, 2026

(54) ROLLABLE OR FOLDABLE GLASS SHEET FOR VEHICLE INTERIOR SYSTEMS

(71) Applicant: CORNING INCORPORATED, Corning, NY (US)

(72) Inventors: Matthew Lee Black, Naples, NY (US); Khaled Layouni, Fontainebleau (FR)

(73) Assignee: Corning Incorporated, Corning, NY (US)

(*) Notice: Subject to any disclaimer, the term of this patent is extended or adjusted under 35 U.S.C. 154(b) by 500 days.

(21) Appl. No.: 18/137,654

(22) Filed: Apr. 21, 2023

(65) Prior Publication Data

US 2023/0257296 A1 Aug. 17, 2023

Related U.S. Application Data

(62) Division of application No. 17/330,732, filed on May 26, 2021, now Pat. No. 11,655,182.

(Continued)

(51) Int. Cl.
*C03C 4/18* (2006.01)
*C03C 3/083* (2006.01)

(Continued)

(52) U.S. Cl.
CPC ................ *C03C 4/18* (2013.01); *C03C 3/083* (2013.01); *C03C 3/085* (2013.01); *C03C 3/087* (2013.01);

(Continued)

(58) Field of Classification Search
CPC ........... C03C 4/18; C03C 3/083; C03C 3/085; C03C 3/087; C03C 3/091; C03C 3/093;

(Continued)

(56) References Cited

U.S. PATENT DOCUMENTS 9,960,375 B2 5/2018 Shin et al.
10,582,622 B2 3/2020 Kim et al.

(Continued)

FOREIGN PATENT DOCUMENTS

CN 108328940 A 7/2018
CN 216128215 U 3/2022

(Continued)

OTHER PUBLICATIONS

Espacenet Translation of WO-2021073798-A1 (Year: 2025).*

(Continued)

*Primary Examiner* — Michael Zhang
(74) *Attorney, Agent, or Firm* — Daniel J. Greenhalgh

(57) ABSTRACT

Embodiments of the disclosure relate to a rollable glass sheet configured to reversibly transition between a flat configuration and a bent configuration. The rollable glass sheet includes a first major surface and a second major surface opposite to the first major surface. The first major surface and the second major surface define a thickness of the glass sheet that is 0.4 mm or less. In the flat configuration, the first major surface includes a first surface compressive stress and a first depth of compression, and in the bent configuration, the first major surface includes a curvature. At a radius of curvature of 50 mm, the first major surface includes a second surface compressive stress less than the first compressive stress and a second depth of compression less than the first depth of compression and greater than 11 μm.

11 Claims, 8 Drawing Sheets

Related U.S. Application Data

(60) Provisional application No. 63/031,617, filed on May 29, 2020.

(51) Int. Cl.

| | |
|---|---|
| ***C03C 3/085*** | (2006.01) |
| ***C03C 3/087*** | (2006.01) |
| ***C03C 3/091*** | (2006.01) |
| ***C03C 3/093*** | (2006.01) |
| ***C03C 3/097*** | (2006.01) |
| ***C03C 21/00*** | (2006.01) |

(52) U.S. Cl.
CPC .............. *C03C 3/091* (2013.01); *C03C 3/093* (2013.01); *C03C 3/097* (2013.01); *C03C 21/002* (2013.01); *C03C 2204/00* (2013.01)

(58) Field of Classification Search
CPC ... C03C 3/097; C03C 21/002; C03C 2204/00; B60R 11/0235; B60R 2011/0007; B60R 2011/0082; C03B 23/02; G09F 9/301; G09F 21/04; B60K 35/00; B60K 35/22
See application file for complete search history.

(56) References Cited

U.S. PATENT DOCUMENTS

| | | | | |
|---|---|---|---|---|
| 10,906,837 | B2 | 2/2021 | Black et al. | |
| D930,557 | S | 9/2021 | Song et al. | |
| D930,558 | S | 9/2021 | Song et al. | |
| 2017/0013726 | A1* | 1/2017 | Han | H05K 7/1427 |
| 2017/0349098 | A1* | 12/2017 | Uhm | B60K 35/53 |
| 2018/0155238 | A1 | 6/2018 | Kim et al. | |
| 2018/0319696 | A1* | 11/2018 | Akiba | C03C 21/002 |
| 2019/0062203 | A1 | 2/2019 | Gross et al. | |
| 2020/0123050 | A1 | 4/2020 | Black et al. | |
| 2021/0045258 | A1* | 2/2021 | Lee | G06F 1/1601 |
| 2021/0206265 | A1 | 7/2021 | Song et al. | |
| 2021/0212225 | A1 | 7/2021 | Song et al. | |
| 2021/0216183 | A1* | 7/2021 | Kang | B60K 35/81 |
| 2021/0371325 | A1 | 12/2021 | Black et al. | |
| 2022/0279668 | A1* | 9/2022 | Pyo | H05K 5/0217 |

FOREIGN PATENT DOCUMENTS

| | | | | |
|---|---|---|---|---|
| EP | 3099642 | B1 | 3/2018 | |
| KR | 10-2013-0014977 | A | 2/2013 | |
| KR | 10-2018-0063940 | A | 6/2018 | |
| KR | 10-2038987 | B1 | 11/2019 | |
| KR | 30-1129374 | S | 9/2021 | |
| WO | WO-2021073798 | A1 * | 4/2021 | B62D 25/145 |

OTHER PUBLICATIONS

"Standard Test Method for Measurement of Glass Stress-Optical Coefficient", In ASTM standard C770-98, 2013.
European Patent Application No. 21175314.0, Extended European Search Report dated Oct. 26, 2021; 8 pages; European Patent Office.
Chinese Patent Application No. 202110591880.4, Office Action dated Nov. 15, 2025, 4 pages (English Translation only), Chinese Patent Office.

* cited by examiner

ROLLABLE OR FOLDABLE GLASS SHEET FOR VEHICLE INTERIOR SYSTEMS

CROSS-REFERENCE TO RELATED APPLICATIONS

This application is a divisional application and claims the benefit of priority under 35 U.S.C. § 120 of U.S. application Ser. No. 17/330,732 filed May 26, 2021, which in turn claims the benefit of priority under 35 U.S.C. § 119 of U.S. Provisional Application Ser. No. 63/031,617 filed on May 29, 2020, the contents of which are relied upon and incorporated herein by reference in their entirety.

BACKGROUND

The disclosure relates to vehicle interior systems, in particular to a rollable or foldable glass sheet that can be used in a retractable display system of a vehicle interior system.

Vehicle interiors include a variety of displays for information and entertainment. For example, a vehicle interior may include an instrument cluster behind the steering wheel providing information on current speed, rpms, tire pressure, maintenance warnings, fuel level, coolant temperature, etc. Additionally, the center console may include an entertainment or control center with a touchscreen display for manipulating the audio system, GPS, cabin temperature, etc. Besides the additional functionality provided by these displays, efforts are made to incorporate them in the cabin interior in an unobtrusive or aesthetically pleasing way, especially by blending the display with the textures or patterns of the vehicle interior.

SUMMARY

According to an aspect, embodiments of the disclosure relate to a rollable glass sheet configured to reversibly transition between a flat configuration and a bent configuration. The rollable glass sheet includes a first major surface and a second major surface opposite to the first major surface. The first major surface and the second major surface define a thickness of the glass sheet that is 0.4 mm or less. In the flat configuration, the first major surface includes a first surface compressive stress and a first depth of compression, and in the bent configuration, the first major surface includes a curvature. At a radius of curvature of 50 mm, the first major surface includes a second surface compressive stress less than the first compressive stress and a second depth of compression less than the first depth of compression and greater than 11 μm.

According to another aspect, embodiments of the disclosure relate to a display system for a vehicle interior system. The display system includes a support structure and a glass sheet connected to the support structure. The glass sheet includes a first major surface and a second major surface opposite to the first major surface. The first major surface and the second major surface define a thickness of the glass sheet. The thickness is 0.4 mm or less. The glass sheet is configured to reversibly transition between a retracted configuration and a deployed configuration. The support structure reinforces the glass sheet in the deployed configuration. In the deployed configuration, the glass sheet has a planar section having a central tension between the first major surface and the second major surface. The central tension is from 95 MPa to 175 MPa. In the retracted configuration, the second major surface includes a curved region, and at a radius of curvature of 50 mm, the second major surface in the curved region has a bent depth of compression of greater than 11 μm.

According to still another aspect, embodiments of the disclosure relate to a method in which a glass sheet is retracted from a deployed configuration to a retracted configuration. The glass sheet includes a first major surface and a second major surface opposite to the first major surface. The first major surface and the second major surface define a thickness of the glass sheet. The thickness is 0.4 mm or less. In the deployed configuration, the glass sheet has a planar section having a central tension between the first major surface and the second major surface. The central tension is from 95 MPa to 175 MPa. In the retracted configuration, the second major surface includes a curved region, and at a radius of curvature of 50 mm, the second major surface in the curved region has a first depth of compression of greater than 11 μm.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification.

BRIEF DESCRIPTION OF THE DRAWINGS

The accompanying drawings incorporated in and forming a part of the specification illustrate several aspects of the present invention and, together with the description, serve to explain the principles of the invention. In the drawings.

DETAILED DESCRIPTION

Reference will now be made in detail to various embodiments, examples of which are illustrated in the accompanying drawings. In general, the various embodiments pertain to a vehicle interior system having a rollable or foldable display screen. In the embodiments discussed herein, the display screen extends from a rolled or folded (i.e., storage) configuration interior to the vehicle interior system to a flat (i.e., deployed) configuration exterior to the vehicle interior system. The glass sheet used for the display screen is configured to be bent to a radius of curvature of 50 mm (or even lower in certain applications) to wind around a reel on the interior of the vehicle interior system. In order to prevent breakage in the stored configuration, the glass sheet is ion-exchange strengthened so as to ensure that the depth of compressive stress (DOC) at a bend radius of 50 mm is greater than 11 μm, which is the average edge flaw depth for glass sheets used in vehicle interiors. Further, in order to meet relevant headform impact testing (HIT) requirements in the deployed configuration, the glass sheet is ion-exchange strengthened so as to ensure that the DOC at a bend radius of 50 mm is less than 19 μm, which is a DOC indicative of too high of a central tension in the deployed configuration to meet HIT requirements. Various embodiments of the glass sheet, display system, vehicle interior system incorporating the display system, and methods of deploying/retracting the display system are disclosed herein. These embodiments are provided by way of illustration and not by way of limitation.

Figure 1A:
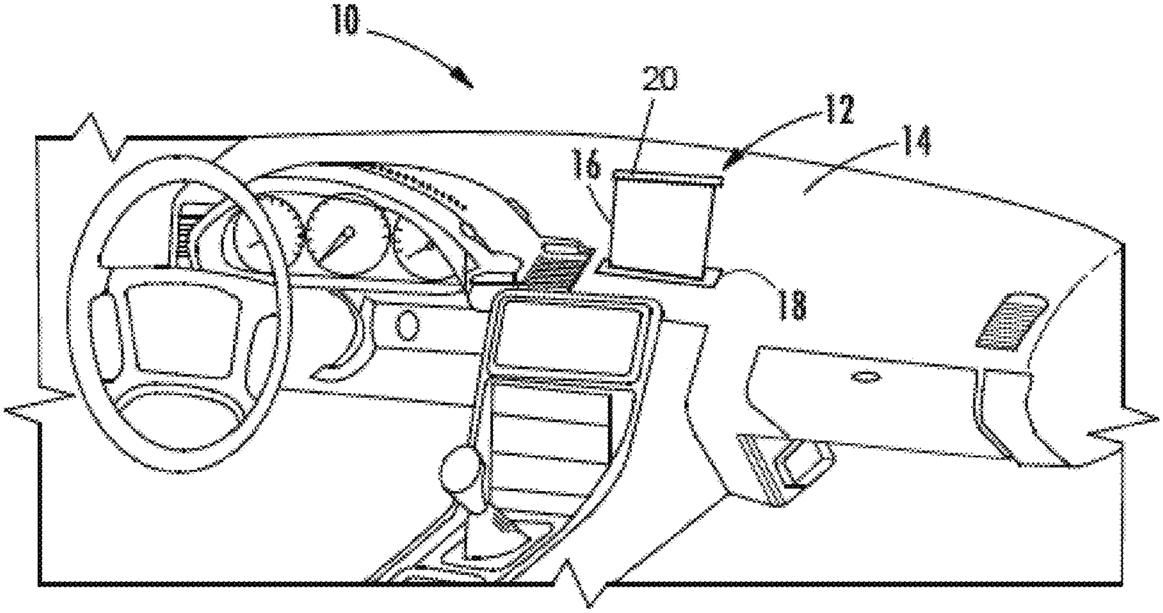
FIGS. 1A and 1B are perspective views of vehicle interiors having a display system with a rollable or foldable glass sheet, according to exemplary embodiments.

FIG. 1A depicts an embodiment of a vehicle interior 10 including a display system 12 of a vehicle interior system, in particular of a dashboard 14. While a dashboard 14 is depicted, the display system 12 can be incorporated into other vehicle interior systems in other embodiments. For example, the display system 12 could extend downwardly from the roof of the vehicle, outwardly from an internal pillar (e.g., using the embodiment shown in FIG. 2D), or upwardly from the floorboard, among other possibilities. In FIG. 1A, the display system 12 is in a deployed configuration in which a rollable or foldable glass sheet 16 of the display system 12 includes a planar section extending from an opening 18 in the surface of the dashboard 14. As will be discussed below, the glass sheet 16 may include a section that remains curved and mechanically engaged to a retraction mechanism below the surface of the dashboard 14. In the embodiment depicted, an endcap 20 is provided at a first end of the glass sheet 16. In embodiments, the endcap 20 is designed to engage the opening 18 (e.g., by nestling into a countersunk region of the opening 18) so that the endcap 20 is flush with the surrounding surface of the dashboard 14 when the glass sheet 16 is retracted. Additionally, as will be discussed below, the endcap 20 may form part of the support structure providing flexural rigidity and stiffness to the glass sheet 16 in the deployed configuration.

Figure 1B:
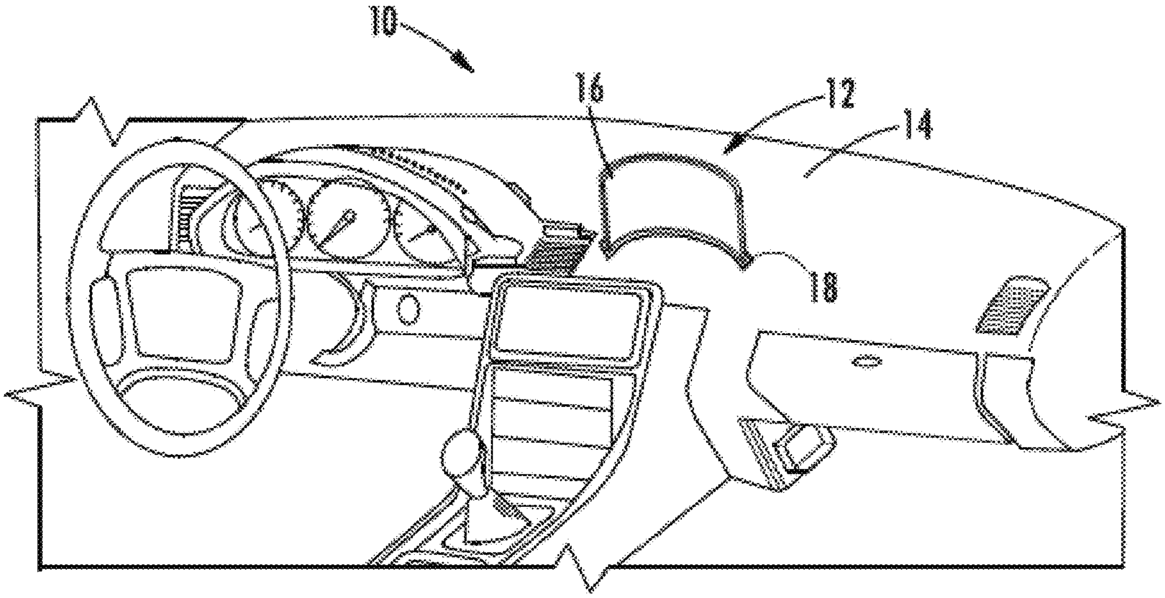

FIG. 1B depicts another embodiment of the display system 12 extending from a dashboard 14. As can be seen in the embodiment of FIG. 1B, the glass sheet 16 of the display system 12 includes a concave curvature facing the vehicle occupants. In embodiments, the curvature provides sufficient rigidity to the glass sheet 16 so that it can support itself. However, in other embodiments, the glass sheet 16 may still include a support structure, especially for meeting relevant HIT requirements.

Figure 2A:
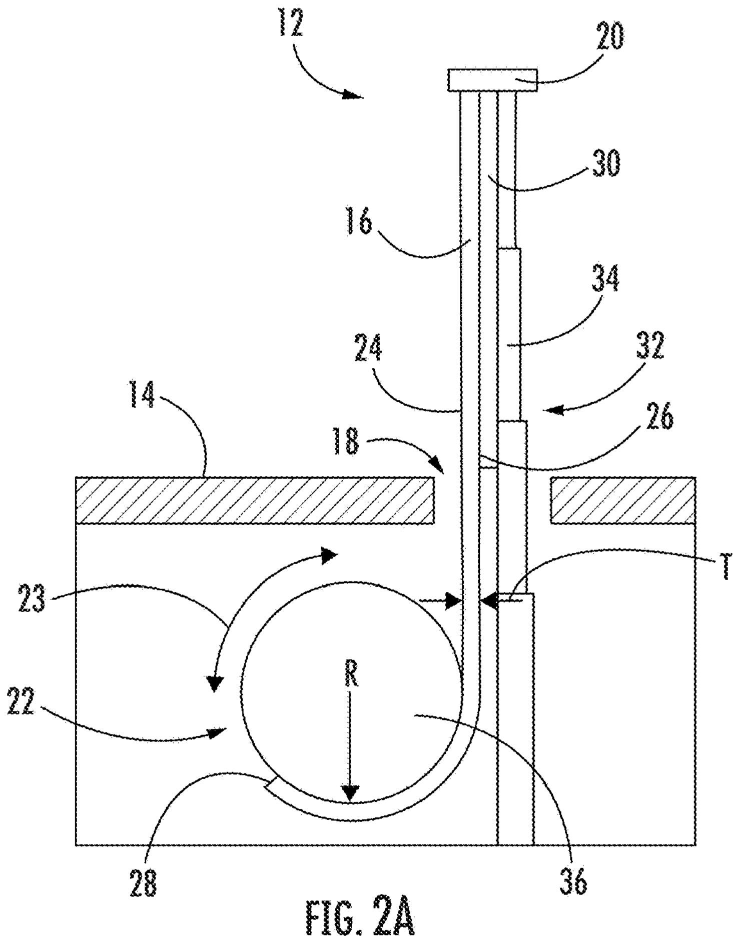
FIGS. 2A-2D depict partial cross-sectional, side views of embodiments of display systems as shown in FIGS. 1A and 1B, according to exemplary embodiments.
Figure 2B:
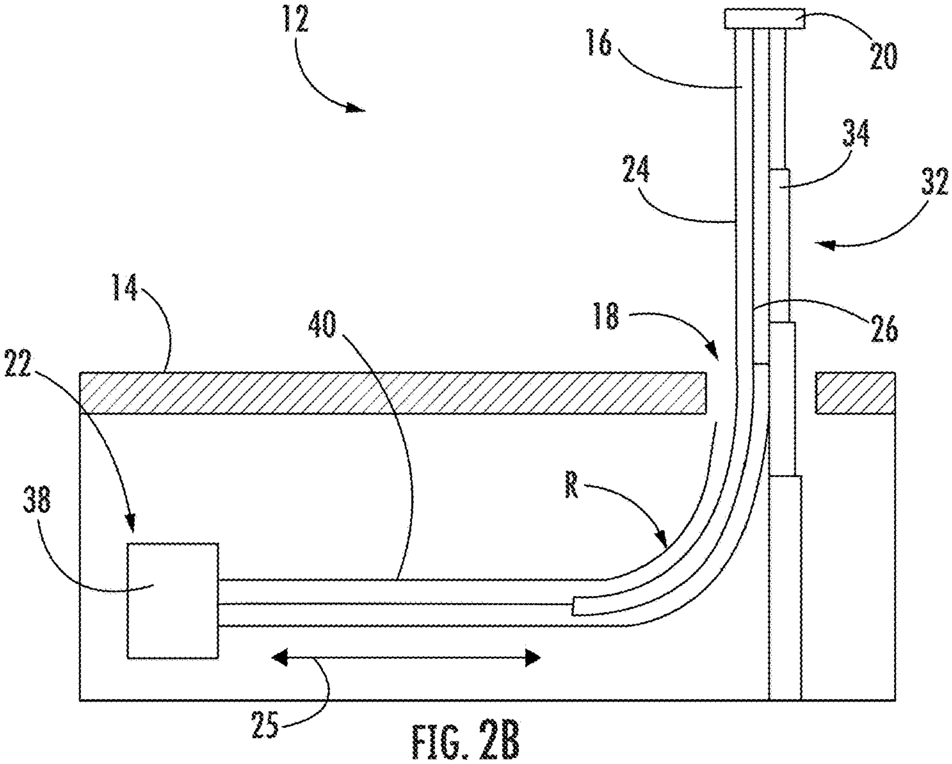

FIG. 2A depicts a partial cross-sectional, side view of the display system 12 with the glass sheet 16 in the deployed configuration. As can be seen in FIG. 2A, the glass sheet 16 remains at least partially engaged with a retraction mechanism 22. As denoted by arc 23, the glass sheet 16 may roll, or wind, around the retraction mechanism 22 as the glass sheet 16 travels from the retracted to deployed position, and vice versa. However, in other embodiments, such as shown in FIG. 2B, the glass sheet 16 may fold, or bend, about the retraction mechanism 22 as denoted by the lateral line 25. In this regard, the glass sheet 16 can be said to be "rollable" or "foldable." In either case, the glass sheet 16 will have at least one region curved to a radius of curvature of the retraction mechanism 22 (although the region may move on the glass sheet 16 as the glass sheet 16 is unrolled or unfolded).

In embodiments, the radius of curvature R of the retraction mechanism 22 is relatively small given that the retraction mechanism 22 is configured to be mounted in the dashboard, which may have limited space in view of all the other typical controls, vents, electronics, etc. contained in the dashboard space. Thus, in embodiments, the retraction mechanism 22 may have a radius of curvature R of, for example about 20 mm to about 100 mm. For the example embodiments discussed below, a radius curvature R of 50 mm was considered. However, in other embodiments, the radius of curvature R may be larger depending on where in the vehicle that the display system 12 is installed.

FIG. 2A shows that the glass sheet 16 includes a first major surface 24 and a second major surface 26 that is opposite to the first major surface 24. The first major surface 24 and the second major surface 26 are joined by minor surface 28 that extends around the periphery of the glass sheet 16. The first major surface 24 and the second major surface 26 define a thickness T therebetween. In general, the thickness T must be relatively thin in order to bend to the radiuses of curvatures contemplated herein. In particular, the average thickness T is less than 0.40 mm, in particular from 0.20 mm to 0.40 mm in embodiments. For reference, the first major surface 24 faces the occupants of the vehicle, and the second major surface 24 faces the windshield (for the embodiment of the display system 12 contained in the dashboard 14). In the embodiment depicted, a display 30 is mounted to the second major surface 24 of the glass sheet 16 using, e.g., optically clear adhesive or a pressure sensitive adhesive. In embodiments, the display 30 is an organic light emitting diode (OLED) display because of its thinness (e.g., <2 mm) and flexibility. In other embodiments, the display 30 can be, e.g., a micro-LED display or any other flexible display. The display 30 covers at least a portion of the planar section of the second major surface 26 that extends above the dashboard 12. In other embodiments, the display 30 may be a projector that illuminates the first or second major surface 24, 26 of the glass sheet 16.

Because of the thinness of the glass sheet 16 and display 30 (when provided), a support structure 32 may be provided to keep the glass sheet 16 and display 30 upright and to provide flexural rigidity to the display system 12 in the deployed state. In embodiments, the support structure 32 is a telescoping frame 34 that extends through the opening 18 from inside the dashboard 14. In embodiments, the telescoping frame 34 is connected to the endcap 20 so that, as the retraction mechanism 22 deploys and retracts the glass sheet 16, the endcap 20 telescopes or collapses the telescoping frame 34.

Figure 2C:
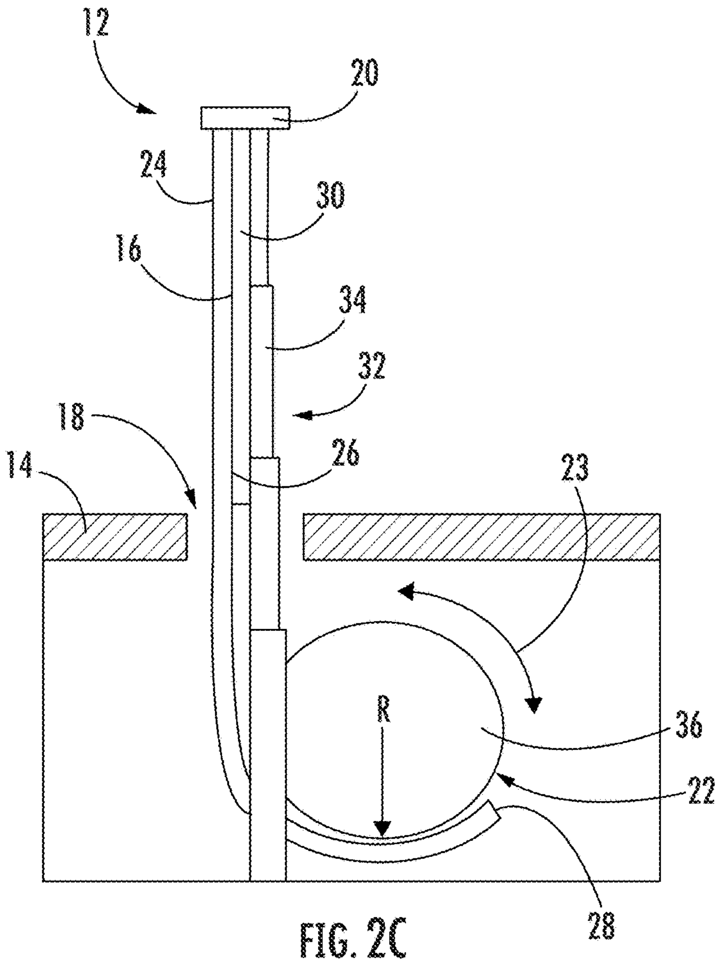

In embodiments in which the glass sheet 16 rolls around the retraction mechanism 22, the retraction mechanism 22 may be a motor-driven rotatable shaft 36 to which a second end of the glass sheet 16 is fixed (e.g., by a fastener or adhesive). By driving the rotatable shaft 36, the second end of the glass sheet 16, by virtue of being fixed to the rotatable shaft 36, will cause the glass sheet 16 to roll or unroll for retraction or deployment, respectively. As shown in FIG. 2C, the glass sheet 16 can roll or unroll in the opposite direction. That is, the first major surface 24 faces the interior of the vehicle, and when rolled or unrolled, the first major surface 24 may be concave or convex.

FIG. 2B depicts an embodiment in which the retraction mechanism 22 includes a linear actuator 38 that pushes the second end of the glass sheet 16 along a track 40. In such an embodiment as mentioned above, the glass sheet 16 folds about the retraction mechanism 22, i.e., along the track 40. Thus, lateral motion of the glass sheet 16 along the track 40 extends or retracts the glass sheet 16 from the dashboard 14. Alternatively, the linear actuator 38 may drive the telescoping frame 34 such that movement of the telescoping frame 34 vertically causes the glass sheet 16 to move along the track 40.

Figure 2D:
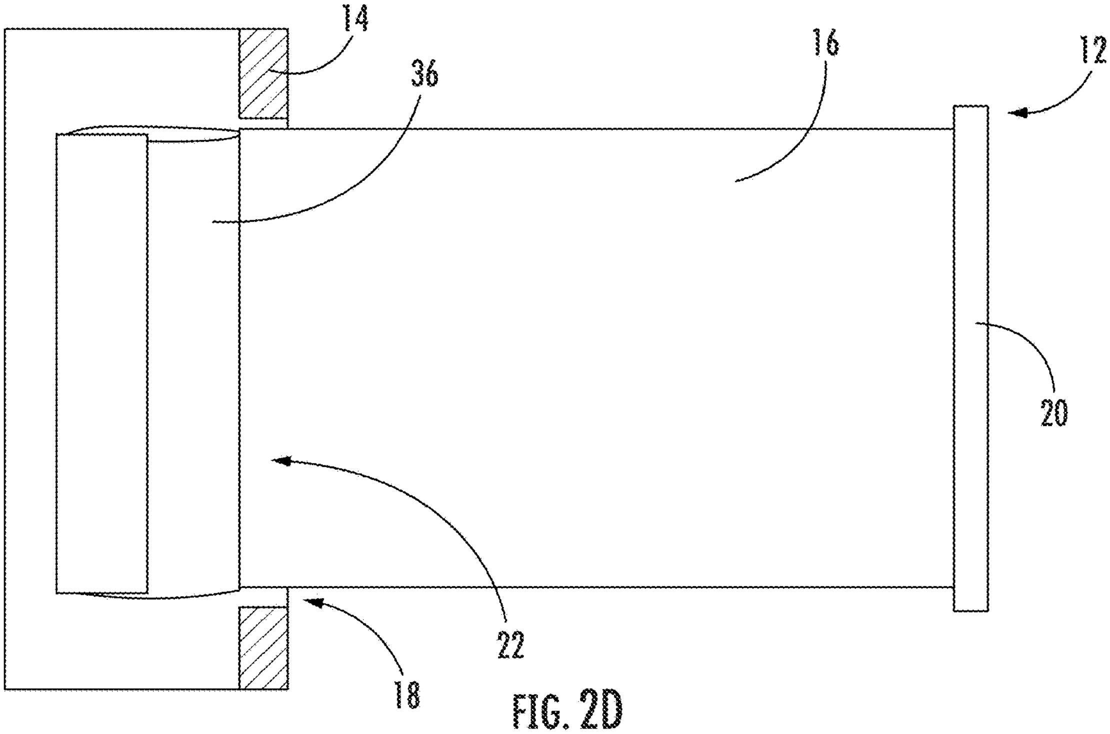

FIG. 2D depicts still another embodiment in which the retraction mechanism 22 is arranged vertically such that the glass sheet 16 extends outwardly (e.g., from an internal pillar or other vertical structure) instead of upwardly as shown in FIGS. 2A-2C. FIG. 2D depicts the retraction mechanism 22 in the form of a rotatable shaft 36. However, in other embodiments, a different retraction mechanism 22 may be used, such as the retraction mechanism shown in FIG. 2B. Further, the display system 12 of FIG. 2D may include a support structure 32 (not shown) as depicted in FIGS. 2A-2C.

While each of the embodiments shown in FIGS. 2A-2D depict the glass sheet 16 extending into a planar configuration when deployed (e.g., as shown in FIG. 1A), these embodiments could also be in the curved configuration as shown in FIG. 1B. In order to deploy into the curved configuration, the shape of the opening 18 can be manipulated to bend the glass sheet 16 as it is deployed. In embodiments, the radius of curvature in the curved configuration can be, e.g., 250 mm or greater, such as from 250 mm to 5000 mm. In other embodiments, the radius of curvature in the curved configuration can be below 250 mm depending on the particular application and size of the space in which the display system 12 is deployed.

Figure 3A:
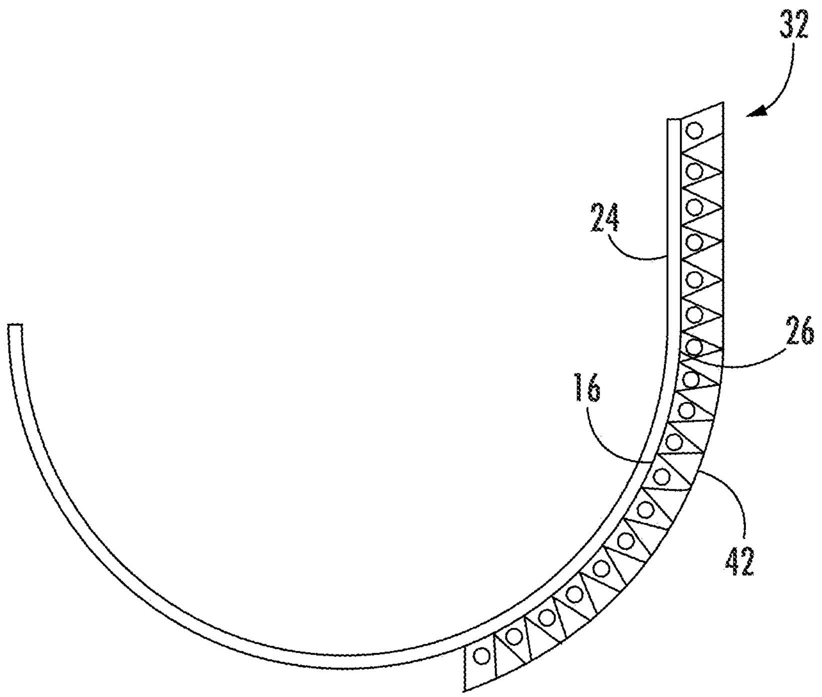
FIGS. 3A and 3B depict an embodiment of a support structure that rolls or folds with the glass sheet, according to an exemplary embodiment.
Figure 3B:
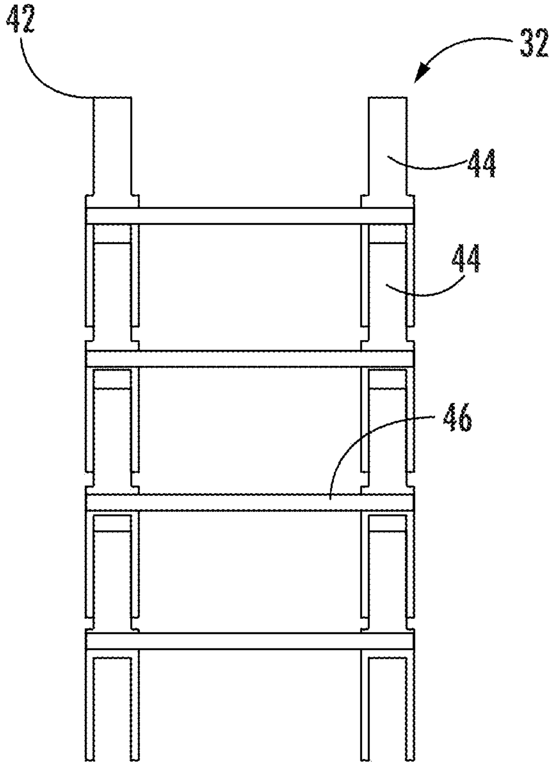

FIGS. 3A and 3B depict another embodiment of a support structure 32 that rolls or folds with the glass sheet 16. In the embodiment of FIG. 3A, the support structure 32 is a linkage system 42. FIG. 3B depicts the linkage system 42 in greater detail. As can be seen, the linkage system 42 includes a plurality of links 44 that extend across and are adhered to the second major surface 26 of the glass sheet 16. In an embodiment, the links 44 are positioned at or proximate to lateral edges of the glass sheet 16. As the glass sheet 16 rolls or folds, the links 44 are able to rotate relative to each other so that the linkage system 42 rolls or folds with the glass sheet 16. In embodiments, the linkage system 42 may further include cross members 46 that provide additional support to the glass sheet 16. In the embodiment depicted in FIG. 3B, each link 44 includes a cross member 46, but in other embodiments, the cross members 46 can be provided every other or every third, fourth, or fifth link, for example and depending on the size of the links 44 and desired level of reinforcement.

In other embodiments, the support structure 32 may be a thin piece of sheet metal that rolls or folds with the glass sheet 16. In still other embodiments, the support structure 32 may be guide rails adhered to the second major surface 26 that follow tracks. The guide rails may be connected by cross members (such as cross members 46 as shown in FIG. 3B) in embodiments.

Independent of the retraction mechanism 22 and support structure 32, the glass sheet 16 may be configured to stop at various positions between the fully retracted and full extended states. In embodiments, the glass sheet 16 extends a height of up to 250 mm above the dashboard 14 in the fully extended state. Further, in embodiments, the glass sheet 16 has a width of up to 200 mm. These dimensions are merely illustrative. A vehicle having more room could accommodate a larger screen.

In order to meet the requirements of headform impact testing (HIT) according to FMVSS 201, the glass sheet 16 is strengthened. Specifically, to pass HIT requirements, the display device 12, upon being impacted by a headform, must not allow the headform to decelerate in a manner that the headform exceeds 80 g of force continuously for a duration of 3 ms or more.

In particular embodiments, the glass sheet 16 is chemically strengthened through an ion exchange process. Details of exemplary ion exchange processes are provided further below. The strengthened glass sheet 16 will have a surface compressive stress (CS) on the first major surface 24 and on the second major surface 26. The compressive stress is at a maximum at the first and second major surfaces 24,26 and will gradually taper going towards the interior. The compressive stress will reach zero, and the distance from the surface to the point where compressive stress reaches zero is referred to the depth of compressive stress (DOC). Thereafter, the stress transitions to a tension stress, reaching a maximum central tension (CT) generally at or near the center of the thickness. The CS, DOC, and CT all have an effect on the performance of the glass sheet 16 in HIT. In embodiments, the flat CS of the glass sheet 16 is in the range of 550 MPa to 1000 MPa, in particular, in the range of 550 MPa to 900 MPa. Further, in embodiments, the flat CT is in the range of 95 MPa to 175 MPa. In still further embodiments, the DOC is at least 32 μm.

Further, the CS and DOC, in particular, have an effect on the bending performance of the glass sheet 16. Because of the way that the glass sheet 16 is rolled or bent, the first major surface 24 will have a different CS and DOC than the second major surface 26. Assuming equal CS and DOC on the first and second surfaces 24,26 in a flat configuration, the CS and DOC on the first major surface 24, which is on the interior of the curve, will increase, and the CS and DOC on the second major surface 26, which is on the exterior of the curve, will decrease. It should be noted that this discussion pertains to, e.g., the embodiments shown in FIGS. 2A and 2B in which the second major surface 26 is concave. The discussion applies equally to embodiments such as shown in FIG. 2C except that it will be the first major surface 24 instead of the second major surface 26 that is concave and will experience the decreased in CS and DOC. Thus, while the following discussion proceeds with reference to the second major surface 26, it applies as well to the first major surface 24 in embodiments where the first major surface 26 includes the concave (exterior) curvature.

Standard edge finishing of a glass sheet 16 will typically leave edge flaws having a depth of up to 11 μm. Accordingly, as disclosed herein, the DOC on the second major surface 26 is maintained above 11 μm under 50 mm bend radius. In particular embodiments, the DOC on the second major surface 26 is maintained above 11 μm under 50 mm bend radius with a safety factor of about 1.5. Thus, the DOC on the second major surface 26 is maintained at 17 μm or more under 50 mm bend radius. However, the DOC on the second major surface 26 is also maintained below 19 μm under 50 mm bend radius so as to keep the CT from rising too high, which would have a negative impact on HIT performance. Further, in embodiments, advanced edge finishing using an HF etching can reduce edge flaws down to 3 μm or lower. Thus, in embodiments in which the glass sheet 16 undergoes advanced edge finishing, the DOC under 50 mm bend radius can be decreased even further even including a safety factor. In embodiments, the DOC under 50 mm bend radius for an advanced edge finish glass is at least 5 μm, at least 7 μm, or at least 10 μm.

The DOC under 50 mm bend radius (hereinafter referred to as "R50 DOC") is influenced by the flat DOC and CS. In particular, when bent to a radius of 50 mm, the DOC will decrease from the flat DOC to the R50 DOC. For a relatively higher flat CS, the flat DOC can be shallower while still providing an R50 DOC within the range of 11 μm to 19 μm, in particular within the range of 17 μm to less than 19 μm. Conversely, for a relatively lower flat CS, the flat DOC will need to be deeper to provide an R50 DOC within the specified range. The following Tables 1-5 and FIGS. 4-7 depict the relationship between the flat DOC, flat CS, and R50 DOC.

In particular, the following Tables 1-5 consider the flat DOC, flat CS, and R50 DOC for five thicknesses ranging from 0.21 mm to 0.40 mm. CS can be measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method.

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass sheet is chemically strengthened by an ion exchange treatment, FSM or SCALP may be used depending on which ion is exchanged into the glass sheet. Where the stress in the glass sheet is generated by exchanging potassium ions into the glass sheet, FSM is used to measure DOC. Where the stress is generated by exchanging sodium ions into the glass sheet, SCALP is used to measure DOC. Where the stress in the glass sheet is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass sheets is measured by FSM. CT is the maximum tensile stress and is measured by SCALP.

Knowing the CS and DOC, the CT and bending stress can be estimated using numerical models. In particular, the CT is estimated according to Equation 1, below:

$$CT = \frac{CS \times DOC}{T - 2 \times DOC}$$

in which CT is the central tension, CS is the surface compressive stress, DOC is the depth of compressive stress, and T is the thickness of the glass sheet 16.

The bend induced stress is determined by Equation 2, below:

$$\sigma_{bend} = \left(\frac{E}{1 - v^2}\right)\left(\frac{T}{2} - x\right)\left(\frac{1}{R}\right)$$

in which $\sigma_{bend}$ is the bend induced stress, E is the Young's Modulus, the v is Poisson's Ratio, T is the thickness of the glass sheet 16, x is the depth into the thickness, and R is the bend radius. The bend stress is maximum at the surface, where x=0, and the neutral axis is at the mid-thickness, or x=T/2.

The resulting shift in the stress profile resulting from bending is the superposition of the stress profile in the flat state and the linear bend stress provided Equation 2. The DOC in the bent state is determined by the zero-stress depth. The particular DOC of interest is for the second major surface 26, which will have an R50 DOC reduced from the flat DOC.

Table 1, below, considers a glass sheet 16 having a thickness T of 0.21 mm. The flat DOC is given on the right side of the table, the flat CS (in MPa) for each flat CS are provided on the interior of the table, and the resulting R50 DOC is provided across the top of the table.

TABLE 1

Flat DOC and CS (MPa) to achieve desired R50 DOC for 0.21 mm thick glass sheet

| | | R50 DOC | | |
|---|---|---|---|---|
| | | 17.0 μm | 18.0 μm | 19.0 μm |
| Flat DOC | 32 μm | 675 | 775 | 945 |
| | 33 μm | 625 | 725 | 865 |
| | 34 μm | 590 | 680 | 805 |
| | 35 μm | 560 | 640 | 740 |
| | 36 μm | 530 | 600 | 695 |

Figure 4:
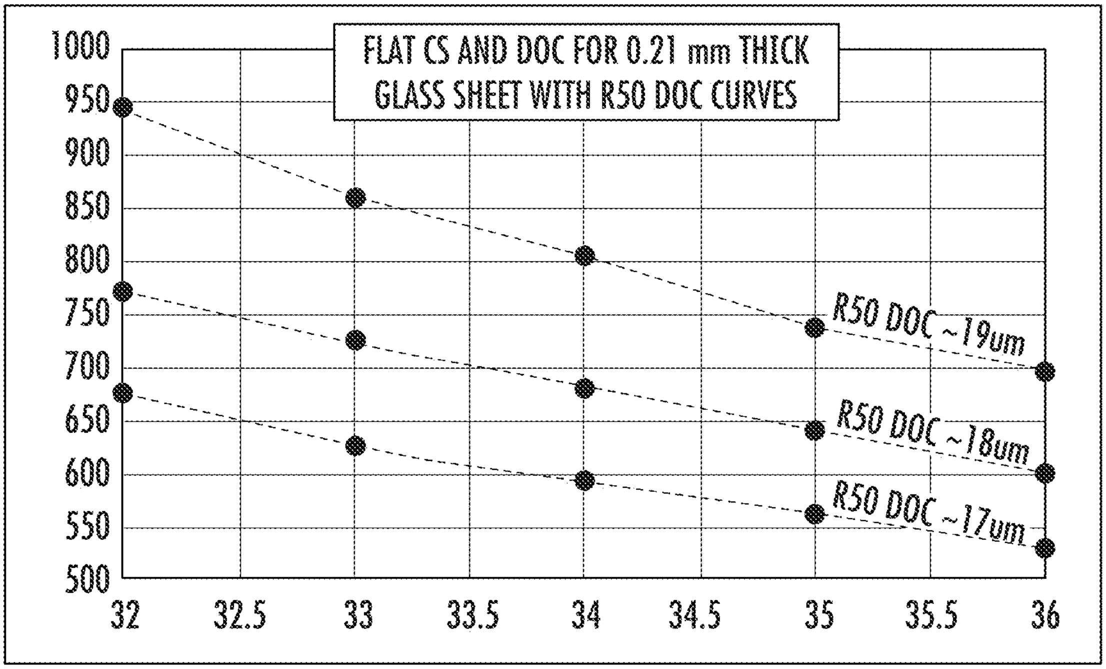
FIGS. 4-8 depict graphs showing the depth of compression in the 50 mm bend radius state as a function of the surface compressive stress and depth of compression in the flat state for various glass thicknesses, according to exemplary embodiments.

As can be seen from Table 1, a flat CS of 675 MPa and a flat DOC of 32 μm will allow an R50 DOC of 17.0 μm. FIG. 4 depicts a curve generated based on the data points contained in Table 1. In general, a flat DOC and flat CS selected to fall in the area between the curves for R50 DOC of 17.0 μm and R50 DOC of 19.0 μm will provide a glass sheet 16 cable of being rolled or folded to a radius of 50 mm while still having a DOC deeper than typical edge flaws (with a safety factor). Further, the flat CS and DOC falling within the area between the curves for R50 DOC of 17.0 μm and R50 DOC of 19.0 μm will be associated with a CT (given by Equation 1) that will allow the glass sheet 16 to meet HIT requirements in planar sections, such as when the display system 12 is in the deployed configuration. In particular, a flat CS and DOC falling with the are between the curves for R50 DOC of 17.0 μm and R50 DOC of 18.0 μm will provide a safety factor for both edge flaws and CT.

Table 2, below, considers a glass sheet 16 having a thickness T of 0.25 mm. The data for flat DOC, flat CS (MPa), and R50 DOC are arranged in the same manner as Table 1.

TABLE 2

Flat DOC and CS (MPa) to achieve desired R50 DOC for 0.25 mm thick glass sheet

| | | R50 DOC | | |
|---|---|---|---|---|
| | | 17.0 μm | 18.0 μm | 19.0 μm |
| Flat DOC | 33 μm | 720 | 800 | 940 |
| | 34 μm | 670 | 765 | 870 |
| | 35 μm | 640 | 720 | 815 |
| | 36 μm | 610 | 690 | 765 |
| | 37 μm | 590 | 655 | 725 |

Figure 5:
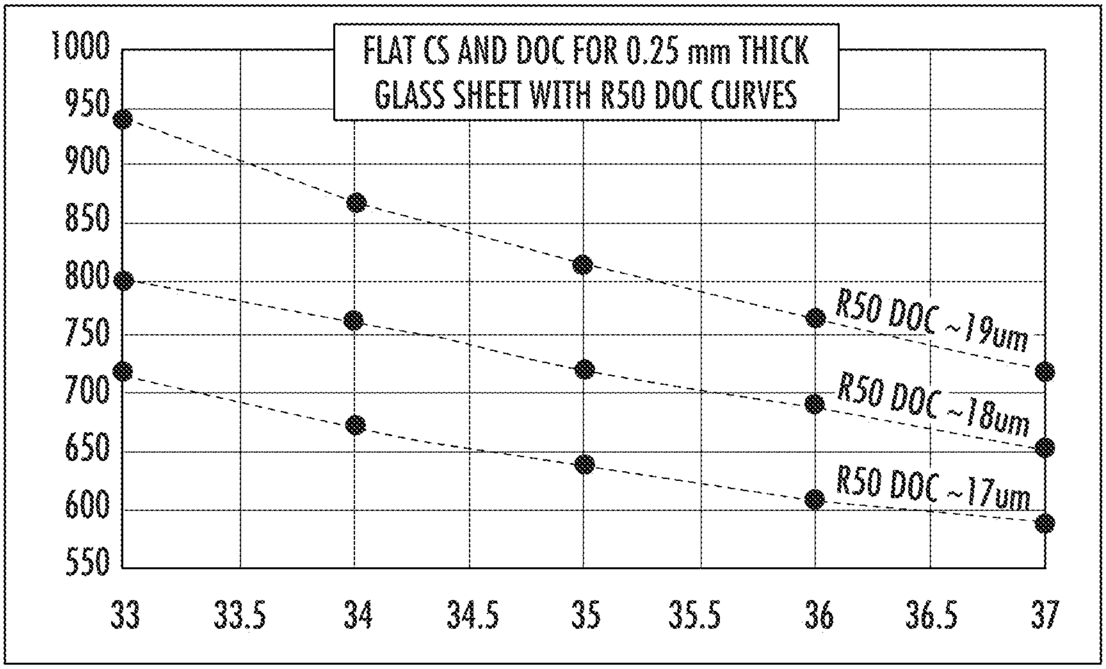

FIG. 5 depicts curves for R50 DOC for 17.0 μm, 18.0 μm, and 19.0 μm taken from the data points shown in Table 2. As previously discussed, the flat CS and DOC should be taken from an area between the curves for R50 DOC of 17.0 μm and 19.0 μm, in particular from an area between the curves for R50 DOC of 17.0 μm and 18.0 μm.

Table 3, below, considers a glass sheet 16 having a thickness T of 0.30 mm. The data for flat DOC, flat CS (MPa), and R50 DOC are arranged in the same manner as Tables 1-2.

TABLE 3

Flat DOC and CS (MPa) to achieve desired R50 DOC for 0.30 mm thick glass sheet

| | | R50 DOC | | |
|---|---|---|---|---|
| | | 17.0 μm | 18.0 μm | 19.0 μm |
| Flat DOC | 35 μm | 735 | 820 | 925 |
| | 36 μm | 700 | 775 | 875 |
| | 37 μm | 675 | 750 | 830 |
| | 38 μm | 650 | 715 | 790 |
| | 39 μm | 620 | 680 | 760 |

Figure 6:
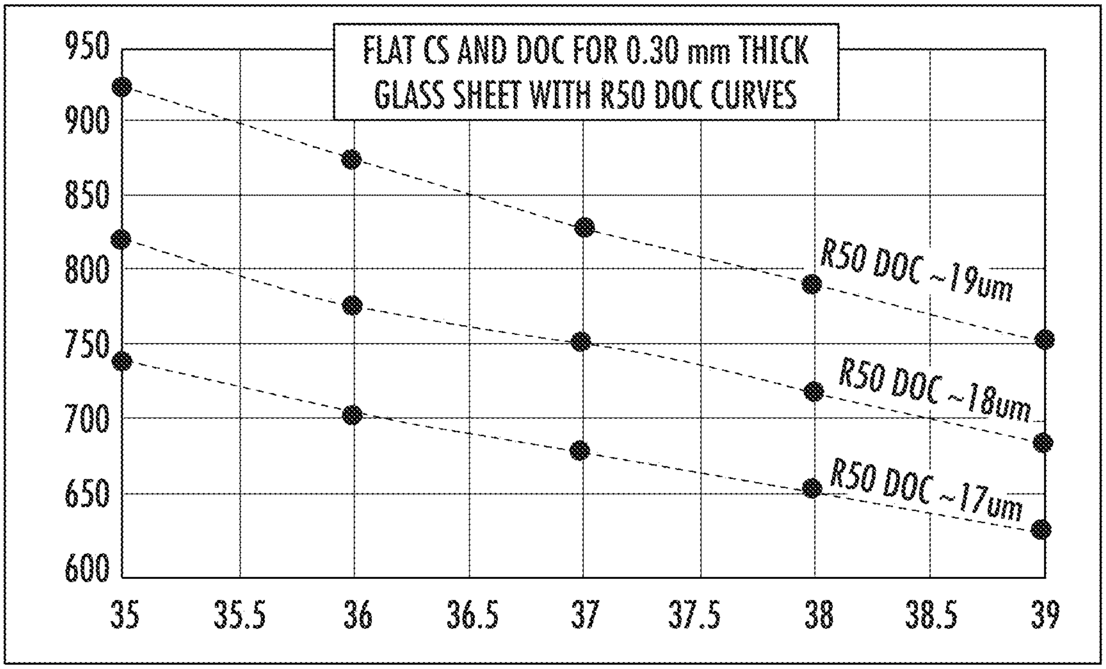

FIG. 6 depicts curves for R50 DOC for 17.0 μm, 18.0 μm, and 19.0 μm taken from the data points shown in Table 3. As previously discussed, the flat CS and DOC should be taken from an area between the curves for R50 DOC of 17.0 μm and 19.0 μm, in particular from an area between the curves for R50 DOC of 17.0 μm and 18.0 μm.

Table 4, below, considers a glass sheet 16 having a thickness T of 0.36 mm. The data for flat DOC, flat CS (MPa), and R50 DOC are arranged in the same manner as Tables 1-3.

TABLE 4

Flat DOC and CS (MPa) to achieve desired R50 DOC for 0.36 mm thick glass sheet

| | | R50 Bent DOC | | |
|---|---|---|---|---|
| | | 17.0 μm | 18.0 μm | 19.0 μm |
| Flat DOC | 37 μm | 795 | 865 | 960 |
| | 38 μm | 760 | 830 | 915 |
| | 39 μm | 735 | 795 | 875 |
| | 40 μm | 710 | 765 | 840 |
| | 41 μm | 690 | 740 | 805 |

Figure 7:
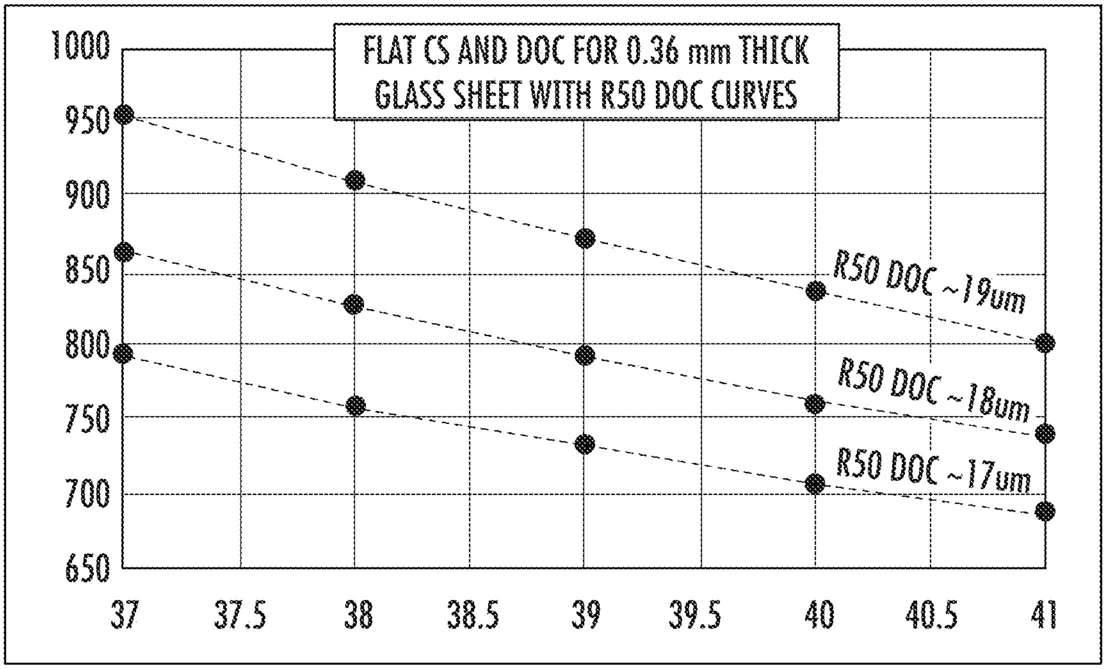

FIG. 7 depicts curves for R50 DOC for 17.0 μm, 18.0 μm, and 19.0 μm taken from the data points shown in Table 4. As previously discussed, the flat CS and DOC should be taken from an area between the curves for R50 DOC of 17.0 μm and 19.0 μm, in particular from an area between the curves for R50 DOC of 17.0 μm and 18.0 μm.

Table 5, below, considers a glass sheet 16 having a thickness T of 0.40 mm. The data for flat DOC, flat CS (MPa), and R50 DOC are arranged in the same manner as Tables 1-4.

TABLE 5

Flat DOC and CS (MPa) to achieve desired R50 DOC for 0.40 mm thick glass sheet

| | | R50 Bent DOC | | |
|---|---|---|---|---|
| | | 17.0 μm | 18.0 μm | 19.0 μm |
| Flat DOC | 38 μm | 840 | 900 | 1000 |
| | 39 μm | 800 | 870 | 955 |
| | 40 μm | 775 | 840 | 920 |
| | 41 μm | 750 | 815 | 885 |
| | 42 μm | 730 | 786 | 855 |

Figure 8:
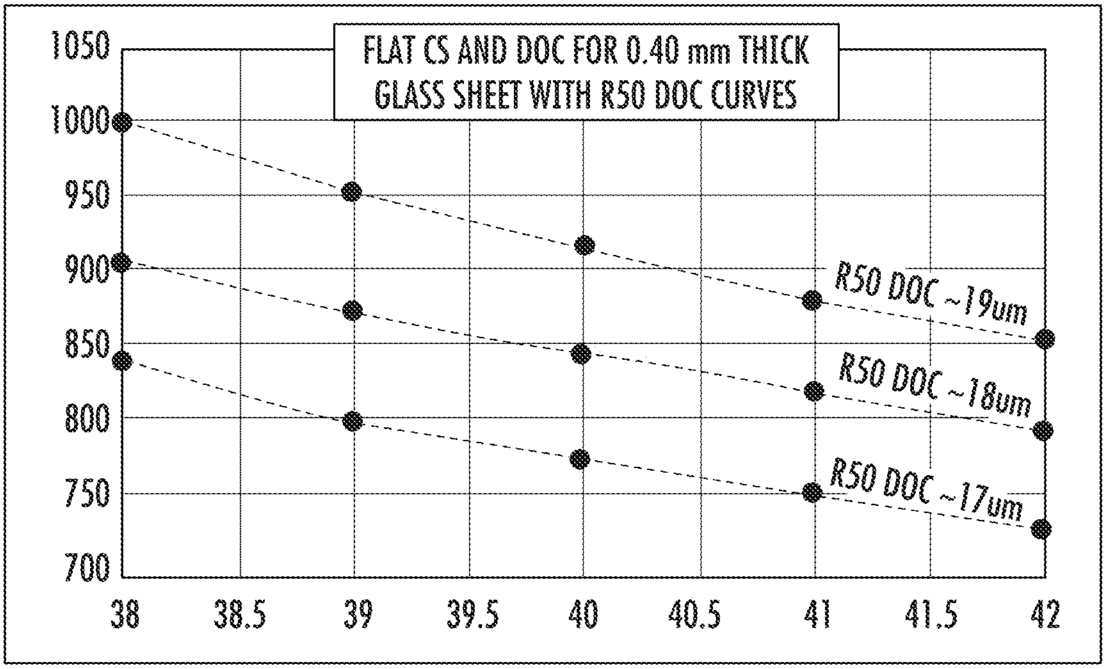

FIG. 8 depicts curves for R50 DOC for 17.0 μm, 18.0 μm, and 19.0 μm taken from the data points shown in Table 5. As previously discussed, the flat CS and DOC should be taken from an area between the curves for R50 DOC of 17.0 μm and 19.0 μm, in particular from an area between the curves for R50 DOC of 17.0 μm and 18.0 μm.

With respect to the data provided in Tables 1-5 and shown in FIGS. 4-8, the flat DOC and flat CS are provided by way of example only. The flat DOC and flat CS used can be outside of the ranges shown in the respective table and graph. For example, Table 5 provides a range of flat DOC of 38 μm to 42 μm and a range of flat CS associated therewith. However, the flat DOC and flat CS can be extended outside that range as long as the flat DOC and flat CS fall within the area between the R50 DOC curves for 17.0 μm and 19.0 μm as extrapolated past the boundaries of the graph shown in FIG. 8. The same can also be said for the flat DOC and flat CS of Tables 1-4 and FIGS. 4-7. In general, the lower limit for flat DOC will be 11 μm to account for edge flaws, and the upper limit will be defined in part by the thickness T of the glass sheet 16 and the stress profile produced by strengthening. Further, certain flat DOC and flat CS may be technically achievable but not commercially feasible, which will limit their application in typical products produced according to the present disclosure.

The foregoing analysis is further supported by experimental data as will be discussed below. In the experiments, glass sheets 16 having a thickness of 0.3 mm and 0.4 mm were cut into coupons having dimensions of 200 mm×340 mm. The glass sheets 16 had a Young's modulus (E) of 71.5 GPa and a Poisson's ratio (v) of 0.21. The glass sheets 16 were edge finished to a standard PRC bullnose using 400 and 800 grit wheels. The coupons cut from the glass sheets 16 were ion-exchanged. For the 0.3 mm thick coupons, the flat CS was 781 MPa, and the flat DOC was 36 μm. For the 0.4 mm thick coupons, the flat CS was 803 MPa, and the flat DOC was 40 μm.

Figure 9:
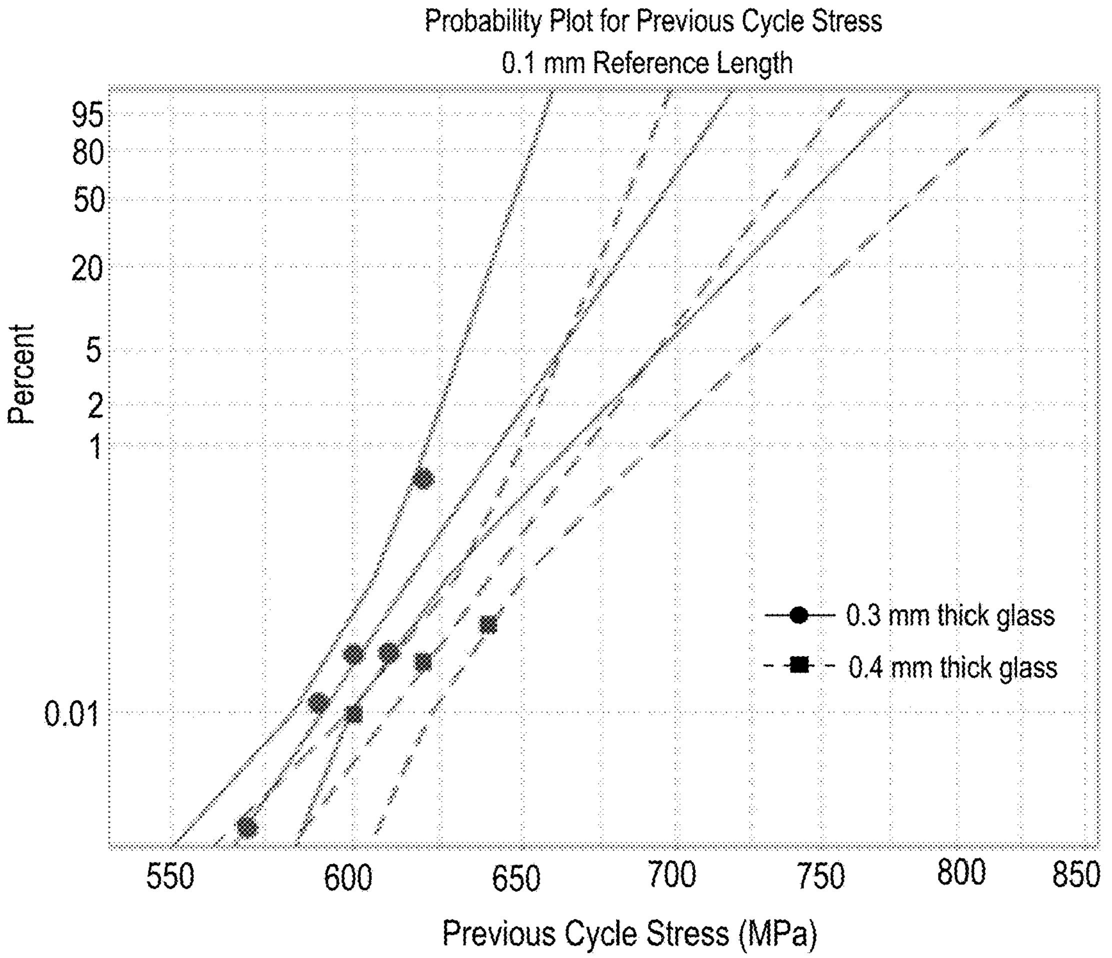
FIG. 9 depicts a Weibull plot of applied bend stress on 0.3 mm and 0.4 mm thick glass at a 0.1 mm reference length, according to exemplary embodiments.

Coupons were tested in 2 point bend tests to generate Weibull plots as shown in FIG. 9. This Weibull plot considers a constant stress over 0.1 mm reference length. The Weibull plot can be used to estimate lifetime performance, such as the allowable lifetime stress, of a product based on parameters derived from the Weibull plot. Two parameters of particular interest to calculations performed below are the Weibull characteristic strength value $S_0$ (fracture stress at 63.2% probability of failure) and the Weibull modulus m. From the Weibull plot of FIG. 9, the characteristic strength value $S_0$ was determined to be 736.9 MPa for the 0.4 mm thick glass and 699.0 MPa for the 0.3 mm glass. Also, from the Weibull plot of FIG. 9, the Weibull modulus m was determined to be 49 for the 0.4 mm glass coupons and 55 for the 0.3 mm glass coupons.

In order to determine how the glasses of these thicknesses would respond to being rolled or folded at a particular radius of curvature for a given period of time, the allowable lifetime stress, $S_{AL}$, for the 0.4 mm and 0.3 mm thick glasses was determined according to Equation 3:

$$S_{AL} = S_0(F_P * F_S * F_F)$$

$S_0$ is the Weibull characteristic strength value (referenced above), $F_P$ is the probability factor, $F_S$ is the size factor, and $F_F$ is the fatigue factor. The fatigue factor $F_F$ can be ignored in this instance because the edge flaws are maintained within the DOC as discussed above. The probability factor $F_P$ is given by Equation 4:

$$F_P = \left[\ln\left(\frac{1}{R'}\right)\right]^{\frac{1}{m}}$$

in which R' is the reliability and m is the Weibull modulus for the 0.3 mm thick glass coupons and 0.4 mm thick glass coupons. The reliability R' is the desired level of parts designed to operate without failure under a given set of conditions. In this instance, the failure probability is desired to be at most 0.10% or 0.001, and thus, the reliability R is 99.9% or 0.999. Based on Equation 4, the desired reliability R', and the Weibull parameters from the plot of FIG. 9, the probability factor Fr for the 0.4 mm thick glass was determined to be 0.853, and the probability factor $F_P$ was determined to be 0.869 for the 0.3 mm glass.

The size factor $F_S$ is given by Equation 5:

$$F_S = \left[\left(\frac{L_{reference}}{L_{product}}\right)\right]^{\frac{1}{m}}$$

in which $L_{reference}$ is the reference length used to generate the Weibull plot, which was 0.1 mm as mentioned above. $L_{product}$ is the actual length of the product being analyzed. Here, the coupons were cut to a length of 340 mm on the sides that are to be bent. Further, there are two sides that are bent, so the total $L_{product}$ is 2*340 mm, or 680 mm. Again, m is the Weibull modulus, which is 49 and 55 for the 0.4 mm and 0.3 mm thick glasses, respectively. Based on the foregoing parameters and Equation 5, the size factor $F_S$ is 0.835 for the 0.4 mm thick glass sheets 16, and the size factor $F_S$ is 0.852 for the 0.3 mm thick glass sheets 16.

From Equation 3, the allowable lifetime stress $S_{AL}$ can be determined using the Weibull characteristic strength $S_0$, the probability factor $F_P$, and the size factor $F_S$. For the 0.4 mm thick glass, the allowable lifetime stress $S_{AL}$ was determined to be about 525 MPa (736.9*0.853*0.835), and the allowable lifetime stress $S_{AL}$ was determined to be about 518 MPa (699.0*0.869*0.852) for the 0.3 mm thick glass.

With knowledge of the allowable lifetime stress at the desired failure rate of 0.10%, the tightest radius at which the 0.4 mm and 0.3 mm glasses can be stored with a high degree of reliability can be determined. In particular, using the allowable lifetime stress $S_{AL}$ as the maximum bend stress in Equation 2, above, the radius to produce that stress can be determined. In particular, Equation 2 can be rearranged to solve for the radius of curvature R for the 0.4 mm and 0.3 mm thick glasses as shown below:

$$R_{0.4mm} = \frac{ET}{2(1-\nu^2)S_{AL}} = \frac{71.5\text{ GPa} * 0.4\text{ mm}}{2(1-0.21^2)\ 525\text{ MPa}} \approx 29\text{ mm}$$

$$R_{0.3mm} = \frac{ET}{2(1-\nu^2)S_{AL}} = \frac{71.5\text{ GPa} * 0.3\text{ mm}}{2(1-0.21^2)\ 518\text{ MPa}} \approx 22\text{ mm}$$

Thus, using the allowable lifetime stress $S_{AL}$ developed from the Weibull plot and the maximum stress from Equation 2, the minimum or tightest bend radius for the 0.4 mm thick glass was determined to be about 29 mm, and the minimum or tightest bend radius for the 0.3 mm thick glass was determined to be about 22 mm. It should be noted that the bend stress for a radius of curvature of 50 mm discussed above is well below the allowable lifetime stress for each of the 0.4 mm and 0.3 mm glasses (bend stresses of about 300 MPa and about 225 MPa, respectively). Thus, the glasses having a thickness of 0.4 mm and 0.3 mm could reliably be stored at curvatures below a radius of 50 mm, or the reliability of the 0.4 mm and 0.3 mm glasses in storage could be increased by storing them at curvatures greater than 29 mm and 22 mm, respectively.

Figure 10:
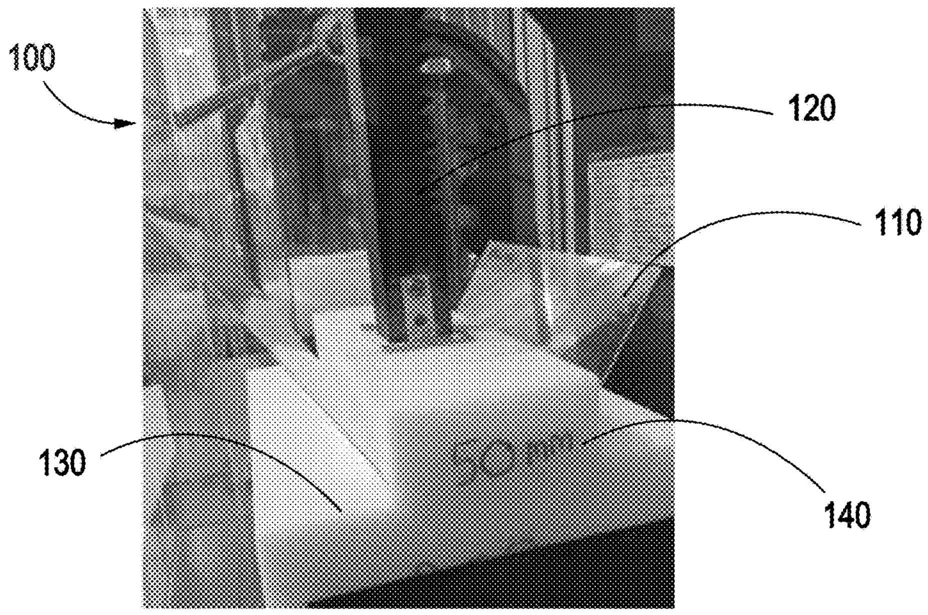
FIG. 10 depicts an apparatus for holding a glass in static bending, according to an exemplary embodiment.

In order to confirm these analytical and experimental observations, 0.4 mm and 0.3 mm thick glass coupons as described above were held in static bend at various curvatures for a week or longer to determine reliability performance. FIG. 10 depicts an apparatus 100 used to hold the glass coupons 110 in static bend using an upper press 120 and a lower die 130. The upper press 120 included a block 140 having a convex surface curved at the bend radius under investigation, and the lower die 130 included a concave surface curved at the bend radius under investigation. The particular apparatus 100 shown in FIG. 10 was configured to hold the glass coupon 110 at a bend radius of 50 mm, and the length under constant bend (i.e., the portion of the glass coupon 110 between the convex and concave surfaces of the block 140 and die 130) was 110 mm. In other apparatuses, the 0.4 mm and 0.3 mm thick glass coupons were held at radiuses of 35 mm and 25 mm. Ten coupons of each thickness were held at each bend radius for at least one week. Table 6, below, summarizes the results.

TABLE 6

Static Bend Test at Various Bend Radiuses

| Bend Radius | 0.3 mm thick glass coupons | 0.4 mm thick glass coupons |
|---|---|---|
| 50 mm | All 10 samples survived 1 week hold | All 10 samples survived 1 week hold |
| 35 mm | All 10 samples survived 1 week hold | All 10 samples survived 1 week hold |
| 25 mm | 5 samples survived 1 week hold, 5 samples survived 12 week hold | 8 samples failed immediately, 2 samples failed within 10 minutes |

As can be seen from Table 6, all of the sample survived static bending for 1 week at the radiuses of 50 mm and 35 mm, which was expected from the allowable lifetime stress and minimum bend radius calculations. Indeed, the discussion above indicated that both the 0.4 mm glass coupons and the 0.3 mm glass coupons would survive with high reliability at bend radiuses down to 29 mm and 22 mm, respectively. This was demonstrated at the static bend radius of 25 mm in which the 0.3 mm thick glass coupons survived, including 5 samples that we held at a 25 mm radius of curvature for 12 weeks. Further, as the minimum bend radius of 29 mm for the 0.4 mm thick glass coupons predicted, holding the 0.4 mm thick glass coupons at a lower bend radius of 25 mm caused 8 of the 10 samples to fail immediately, and the remaining two samples failed within 10 minutes. Thus, the experimental data confirmed the predictions based on the Weibull plot of FIG. 9 and the predictions from Equations 2-5.

The various embodiments of the display system 12 for the vehicle interior 10 may be incorporated into vehicles such as trains, automobiles (e.g., cars, trucks, buses and the like), sea craft (boats, ships, submarines, and the like), and aircraft (e.g., drones, airplanes, jets, helicopters and the like).

As noted above, glass sheet 16 is strengthened, in particular by chemical strengthening, e.g., through ion-exchange strengthening. In the ion exchange process, ions at or near the surface of the glass sheet are replaced by—or exchanged with—larger ions having the same valence or oxidation state. In those embodiments in which the glass sheet comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass sheet generate a stress.

Ion exchange processes are typically carried out by immersing a glass sheet in a molten salt bath (or two or more molten salt baths) containing the larger ions to be exchanged with the smaller ions in the glass sheet. It should be noted that aqueous salt baths may also be utilized. In addition, the composition of the bath(s) may include more than one type of larger ions (e.g., Na+ and K+) or a single larger ion. It will be appreciated by those skilled in the art that parameters for the ion exchange process, including, but not limited to, bath composition and temperature, immersion time, the number of immersions of the glass sheet in a salt bath (or baths), use of multiple salt baths, additional steps such as annealing, washing, and the like, are generally determined by the composition of the glass sheet (including the structure of the article and any crystalline phases present) and the desired DOC and CS of the glass sheet that results from strengthening. Exemplary molten bath compositions may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass sheet thickness, bath temperature and glass (or monovalent ion) diffusivity. However, temperatures and immersion times different from those described above may also be used.

In one or more embodiments, the glass sheets may be immersed in a molten salt bath of 100% $NaNO_3$, 100% $KNO_3$, or a combination of $NaNO_3$ and $KNO_3$ having a temperature from about 370° C. to about 480° C. In some embodiments, the glass sheet may be immersed in a molten mixed salt bath including from about 5% to about 90% $KNO_3$ and from about 10% to about 95% $NaNO_3$. In one or more embodiments, the glass sheet may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass sheet may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass sheet. The spike may result in a greater surface CS value. This spike can be achieved by a single bath or multiple baths, with the bath(s) having a single composition or mixed composition, due to the unique properties of the glass compositions used in the glass sheets described herein.

In one or more embodiments, where more than one monovalent ion is exchanged into the glass sheet, the different monovalent ions may exchange to different depths within the glass sheet (and generate different magnitudes stresses within the glass sheet at different depths). The resulting relative depths of the stress-generating ions can be determined and cause different characteristics of the stress profile.

Suitable glass compositions for use in glass sheet 16 include soda lime glass, aluminosilicate glass, borosilicate glass, boroaluminosilicate glass, alkali-containing aluminosilicate glass, alkali-containing borosilicate glass, and alkali-containing boroaluminosilicate glass.

In one or more embodiments, the glass composition may include $SiO_2$ in an amount in a range from about 66 mol % to about 80 mol %, $Al_2O_3$ in an amount in a range from about 4 mol % to about 15 mol %, $B_2O_3$ in an amount in a range from about 0 mol % to about 5 mol %, $P_2O_5$ in an amount in a range from about 0 mol % to about 2 mol %, $R_2O$ in an amount in a range from about 8 mol % to about 20 mol %, RO in an amount in a range of from about 0 mol % to about 2 mol %, $ZrO_2$ in an amount in a range of from about 0 mol % to about 0.2 mol %, and $SnO_2$ in an amount in a range from about 0 mol % to about 0.2 mol %. In the foregoing composition, $R_2O$ refers to the total amount of alkali metal oxides, such as $Li_2O$, $Na_2O$, $K_2O$, $Rb_2O$, and $Cs_2O$). In particular, $Na_2O$ may be present in an amount in a range from about from about 8 mol % to about 20 mol %, and $K_2O$ may be present in an amount in a range from about 0 mol % to about 4 mol %. Further, in the foregoing composition, RO refers to the total amount of alkaline earth metal oxide such, as CaO, MgO, BaO, ZnO and SrO. In particular, CaO may be present in an amount in a range of from about 0 mol % to about 1 mol %, and MgO may be present in an amount in a range of from about 0 mol % to about 7 mol %.

In embodiments, the glass composition may include other oxides of such metals as Ti, V, Cr, Mn, Fe, Co, Ni, Cu, Ce, W, and Mo. In particular, Fe in the form of $Fe_2O_3$ may be present in an amount in a range of from about 0 mol % to about 1 mol %, and $TiO_2$ may be present in an amount of in a range of about 0 mol % to about 5 mol %.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A display system for a vehicle interior system having an interior surface with an opening, the display system comprising:
- a support structure;
- a glass sheet connected to the support structure, the glass sheet comprising a first major surface and a second major surface opposite to the first major surface, wherein the first major surface and the second major surface define a thickness of the glass sheet and wherein the thickness is 0.4 mm or less; and
- an actuator configured to move the glass sheet through the opening and reversibly transition the glass sheet between a retracted configuration and a deployed configuration, the actuator engaged to an end of the glass sheet that is disposed below the interior surface in the deployed configuration;
- wherein the support structure reinforces the glass sheet in the deployed configuration and comprises at least one of a telescoping frame, a track system, or a linkage system;
- wherein, in the deployed configuration, the glass sheet comprises a section having a central tension between the first major surface and the second major surface, the central tension being from 95 MPa to 175 MPa, the second major surface in the section comprising a flat depth of compression;
- wherein, in the retracted configuration, the second major surface comprises a curved region having a bent depth of compression that is less than the flat depth of compression, the flat depth of compression selected such that the bent depth of compression is greater than 11 μm and less than 19 μm when the glass sheet is bent to a radius of curvature of 50 mm; and
- wherein the actuator comprises:
  - a rotatable shaft around which the glass sheet in the retracted configuration is wound into a roll having a radius of curvature greater than 35 mm and less than 100 mm, or
  - a linear actuator configured to translate the glass sheet.

2. The display system of claim 1, wherein, in the deployed configuration, the second major surface in the section comprises a first surface compressive stress, wherein in the retracted configuration, the second major surface in the curved region comprises a second surface compressive stress, and wherein the second surface compressive stress is less than the first compressive stress.

3. The display system of claim 2, wherein the flat depth of compression is at least 32 μm and at most 45 μm.

4. The display system of claim 2, wherein the first surface compressive stress is at least 550 MPa and is at most 1000 MPa.

5. The display system of claim 1, wherein the glass sheet comprises an edge finish in which defects have on average a depth of 11 μm or less.

6. The display system of claim 1, further comprising a display on the second major surface of the glass sheet.

7. The display system of claim 1, wherein the section is curved, wherein the first major surface in the curved section includes a concave curvature having a radius of curvature of 250 mm or more.

8. The display system of claim 1, wherein the the end of the glass sheet is engaged to the rotatable shaft in the deployed configuration.

9. The display system of claim 8, wherein the actuator is configured to selectively rotate the rotatable shaft to move the glass sheet through the opening and transition the glass sheet between the deployed configuration and the retracted configuration.

10. The display system of claim 1, wherein the end of the glass sheet is engaged to the linear actuator in the deployed configuration.

11. The display system of claim 10, wherein the linear actuator is configured to translate the glass sheet along a track to move the glass sheet through the opening and transition the glass sheet between the deployed configuration and the retracted configuration.

* * * * *